(12) United States Patent
Robin et al.

(10) Patent No.: US 10,347,143 B2
(45) Date of Patent: Jul. 9, 2019

(54) COLLISION AVOIDANCE METHOD AND SYSTEM FOR A TRAILER AIRCRAFT OF AN AIRCRAFT FORMATION RELATIVE TO AN INTRUDER AIRCRAFT

(71) Applicant: AIRBUS OPERATIONS (S.A.S.), Toulouse (FR)

(72) Inventors: Jean-luc Robin, Saint-Jean (FR); Camille Caruhel, Toulouse (FR); Sylvain Deplanche, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 79 days.

(21) Appl. No.: 15/491,771

(22) Filed: Apr. 19, 2017

(65) Prior Publication Data

US 2017/0301251 A1    Oct. 19, 2017

(30) Foreign Application Priority Data

Apr. 19, 2016 (FR) ...................... 16 53444

(51) Int. Cl.
*G08G 5/04* (2006.01)
*B64D 45/00* (2006.01)
(Continued)

(52) U.S. Cl.
CPC ............. *G08G 5/045* (2013.01); *B64D 45/00* (2013.01); *G05D 1/104* (2013.01); *G08G 5/0008* (2013.01);
(Continued)

(58) Field of Classification Search
CPC .... G08G 5/045; G08G 5/0091; G08G 5/0021; G08G 5/0008; B64D 45/00; G05D 1/104
See application file for complete search history.

(56) References Cited

U.S. PATENT DOCUMENTS 9,536,435 B1 * 1/2017 Shay ...................... G08G 5/045
2002/0080059 A1 6/2002 Tran
(Continued)

FOREIGN PATENT DOCUMENTS

| EP | 2693417 A2 | 2/2014 |
|---|---|---|
| EP | 2772817 A2 | 9/2014 |
| EP | 2892000 A1 | 7/2015 |

OTHER PUBLICATIONS

French Search Report for Application No. 1653444 dated Dec. 9, 2016.

*Primary Examiner* — Rodney A Butler
(74) *Attorney, Agent, or Firm* — Jenkins, Wilson, Taylor & Hunt, P.A.

(57) ABSTRACT

A collision avoidance method and system for a trailer aircraft of an aircraft formation relative to an intruder aircraft. The collision avoidance system is embedded in a trailer aircraft of an aircraft formation and it is intended to avoid a collision relative to at least one aircraft external to the aircraft formation, called intruder aircraft, the aircraft formation including a lead aircraft and the at least one trailer aircraft, the collision avoidance system being configured to bring the trailer aircraft to a safety point dependent on a safety zone, prior to the implementation of an avoidance maneuver, the safety zone corresponding to a zone located to the rear of the lead aircraft and with no wake turbulence generated by the lead aircraft.

17 Claims, 4 Drawing Sheets

(51) Int. Cl.
 *G05D 1/10* (2006.01)
 *G08G 5/00* (2006.01)
(52) U.S. Cl.
 CPC ......... *G08G 5/0021* (2013.01); *G08G 5/0091* (2013.01)

(56) References Cited

U.S. PATENT DOCUMENTS

| | | | | |
|---|---|---|---|---|
| 2002/0089432 | A1* | 7/2002 | Staggs | G01C 23/00 340/945 |
| 2003/0222795 | A1* | 12/2003 | Holforty | B64D 43/00 340/968 |
| 2005/0230563 | A1 | 10/2005 | Corcoran, III | |
| 2007/0103340 | A1* | 5/2007 | Baranov | G01C 23/00 340/968 |
| 2017/0178516 | A1* | 6/2017 | Shenfeld | G08G 5/0008 |

\* cited by examiner

COLLISION AVOIDANCE METHOD AND SYSTEM FOR A TRAILER AIRCRAFT OF AN AIRCRAFT FORMATION RELATIVE TO AN INTRUDER AIRCRAFT

CROSS-REFERENCE TO RELATED APPLICATION

This patent application claims the benefit of and priority to French patent application number FR 16 53444, filed on Apr. 19, 2016, the entire disclosure of which is incorporated by reference herein.

TECHNICAL FIELD

The present disclosure relates to a collision avoidance method and system for an aircraft formation relative to an intruder aircraft.

BACKGROUND

In the context of the present disclosure:
an intruder aircraft should be understood to be an aircraft not forming part of the formation and risking coming into collision with at least one aircraft of the formation, if no avoidance maneuver is implemented; and
a formation flight is considered to comprise at least two aircraft, notably transport airplanes, namely a trailed aircraft, called lead aircraft, and one or more trailer aircraft. The trailer aircraft fly following the aircraft that they trail directly (namely the lead aircraft or another trailer aircraft) so as to maintain a constant spacing between them.

In a preferred application, in particular in cruising flight, the aircraft fly one behind the other at the same flight level with the same heading and the same speed. Provision can also be made to apply to the trailer aircraft speed control commands which are such that they enable the trailer aircraft to have the same position, the same speed, and the same acceleration as the trailed aircraft had with given prior durations.

Such a formation flight offers advantages particularly in terms of fuel consumption. In effect, the formation is generally defined, particularly in terms of separation distance, such that a trailer aircraft is not disturbed by the wake turbulences created by the one or more aircraft, in particular the lead aircraft, preceeding it in the formation.

Wake turbulence or vortex should be understood to mean an aerodynamic turbulence (or vortex) which is formed downstream of an aircraft. The wake turbulence can be generated by the gases ejected by the engines. It can also be created at the end of a wing of an airplane, because of the pressure difference between lower and upper surface and the downward deflection of the flow which results therefrom. A wake turbulence can also appear on parts forming angles with the plane of the wings, such as, for example, control surfaces when they are lowered.

Now, during such a formation flight, an aircraft external to the formation may happen to converge towards at least one of the aircraft of the formation so as to create a risk of collision requiring the implementation of a separation maneuver.

Airliners are equipped with anti-collision systems of TCAS ("Traffic Collision Avoidance System") type which make it possible to ensure the safety of the air traffic by preventing the risks of collision in flight. Thus, when two aircraft converge towards one another, their anti-collision systems compute an estimation of the collision time and emit an alert informing the crews of each aircraft of a possible future collision: such an alert is generally called "traffic advice" or "TA alert". If necessary, the anti-collision systems also emit, for the attention of the crew, a vertical avoidance maneuver command in order to exit from the potential collision situation: such an avoidance maneuver command is generally called "resolution advice" or "RA alert". The TA and RA alerts are embodied by voice messages and by the display of information in the cockpits.

Such an avoidance maneuver generally consists of applying a vertical separation between the aircraft concerned generally of 700 feet for airliners.

Now, such a maneuver generating a change of altitude of at least one of the aircraft of the formation may, depending on the relative positions of the aircraft of the formation and of the intruder aircraft, require a trailer aircraft to cross the wake turbulence (or vortex) created downstream of one of the aircraft (trailer aircraft or lead aircraft) preceding it.

Such a situation can, for example, occur in a formation with two aircraft, when the trailer aircraft is situated at a lower altitude than that of the lead aircraft and the intruder aircraft is arriving from below which then, to perform the avoidance maneuver, requires the trailer aircraft to climb and cross the wake turbulence, if the altitude difference necessary for the avoidance is greater than the altitude difference of the aircraft in the formation. This potential crossing of a wake turbulence prevents, for instability reasons, the keeping of the formation. In such a situation, the avoidance maneuver will break the formation, such that the aircraft can no longer benefit from the abovementioned advantages of the formation flight.

Such standard management of an avoidance maneuver for a formation flight upon a risk of collision is not therefore satisfactory.

SUMMARY

An object of the present disclosure is to remedy this drawback. It relates to a collision avoidance method for at least one trailer aircraft of an aircraft formation, relative to at least one aircraft external to the aircraft formation, called intruder aircraft, the aircraft formation comprising a lead aircraft and the at least one trailer aircraft.

According to the disclosure herein, the collision avoidance method comprises a series of steps, implemented on the trailer aircraft and comprising at least:
a reception step implemented by a data reception unit and consisting in or comprising receiving information on risk of collision with the intruder aircraft, the collision risk information being received as long as the risk of collision exists;
a first computation step implemented by a computation unit and consisting in or comprising determining at least one safety zone upon the reception of collision risk information, the safety zone corresponding to a zone located to the rear of the lead aircraft and with no wake turbulence generated at least by the lead aircraft, this safety zone being notably situated at the same position relative to the lead aircraft and being displaced with the lead aircraft during the flight thereof;
a second computation step implemented by a second computation unit and consisting in or comprising determining a safety point dependent on the safety zone, this safety point being notably situated at the same position relative to the lead aircraft and being displaced with the lead aircraft during the flight thereof; and a control step implemented by a control unit and consisting in or comprising bringing the trailer aircraft to the safety point, prior to the implementation of an avoidance maneuver.

Thus, by virtue of the present disclosure, and as specified hereinbelow, it is possible to bring the trailer aircraft into a hazard-free position (called safety position) relative to the wake turbulences of the lead aircraft, prior to the implementation of an avoidance maneuver. This safety position is such that the trailer aircraft does not have to cross the wake turbulence when it implements the avoidance maneuver. Thus, it is possible to maintain the formation upon the approach of an intruder aircraft. This makes it possible to remedy the abovementioned drawback and thus retain the corresponding advantages, notably in terms of cost, of the formation flight.

Advantageously:

the control step is implemented automatically; and/or the information on risk of collision with the intruder aircraft is generated by a collision risk detection method; and/or the first computation step comprises a step of implementation of a predetermined logic for determining a safety zone.

Furthermore, advantageously, the first determination step consists in determining the safety zone as a function of the geometry of the intruder aircraft and of the position of the trailer aircraft relative to wake turbulences of the lead aircraft.

Moreover, advantageously, the second computation step consists in determining the safety point as a function of the safety zone and of a wake turbulence model.

In a particular embodiment, the series of steps comprises an alert step implemented by at least one alert unit and consisting in or comprising emitting at least one alert in the cockpit of the trailer aircraft, in case of reception of collision risk information, the alert being emitted as long as such collision risk information is received.

Furthermore, advantageously, the series of steps comprises a keeping step, implemented after the control step and consisting in or comprising keeping the trailer aircraft at the safety point relative to the lead aircraft, as long as an alert is emitted.

Moreover, advantageously, the collision avoidance method also comprises an avoidance step, implemented after the series of steps and consisting in or comprising implementing an avoidance maneuver making it possible to avoid the collision with the intruder aircraft while maintaining the formation flight.

The collision avoidance method also comprises a verification step implemented by a verification unit and consisting in or comprising checking whether the aircraft forming part of the aircraft formation are flying in formation.

The present disclosure relates also to a collision avoidance system for a trailer aircraft of an aircraft formation, the collision avoidance system being intended to avoid a collision relative to at least one aircraft external to the aircraft formation, called intruder aircraft, the aircraft formation comprising a lead aircraft and the at least one trailer aircraft.

According to the disclosure herein, the collision avoidance system comprises:

a data reception unit configured to receive information on risk of collision with the intruder aircraft, the collision risk information being received as long as the risk of collision exists;

a first computation unit configured to determine at least one safety zone upon the reception of collision risk information, the safety zone corresponding to a zone located to the rear of the lead aircraft and without wake turbulence generated at least by the lead aircraft, this safety zone thus being always situated at the same position relative to the lead aircraft and being displaced with the lead aircraft during the flight thereof;

a second computation unit configured to determine a safety point dependent on the safety zone, this safety point thus being always situated at the same position relative to the lead aircraft and being displaced with the lead aircraft during the flight thereof; and a control unit configured to bring the trailer aircraft to the safety point, prior to the implementation of an avoidance maneuver.

In a particular embodiment:

the data reception unit and the first computation unit form part of an avoidance unit; and/or the second computation unit and the control unit form part of a keeping unit.

Furthermore, advantageously, the collision avoidance system also comprises:

at least one alert unit configured to emit at least one alert in the cockpit of the trailer aircraft in case of reception of collision risk information, the alert being emitted as long as such collision risk information is received; and/or an avoidance device configured to implement an avoidance maneuver making it possible to avoid the collision with the intruder aircraft while maintaining the formation flight.

The present disclosure further relates to an anti-collision system of TCAS type, which comprises such a collision avoidance system.

The present disclosure also relates to an aircraft, in particular a transport airplane, which is provided with a collision avoidance device and/or an anti-collision system such as those described hereinabove.

BRIEF DESCRIPTION OF THE DRAWINGS

The attached figures will give a clear understanding of how the disclosure herein can be implemented. In these figures, identical references denote similar elements. More particularly.

DETAILED DESCRIPTION

Figure 1:
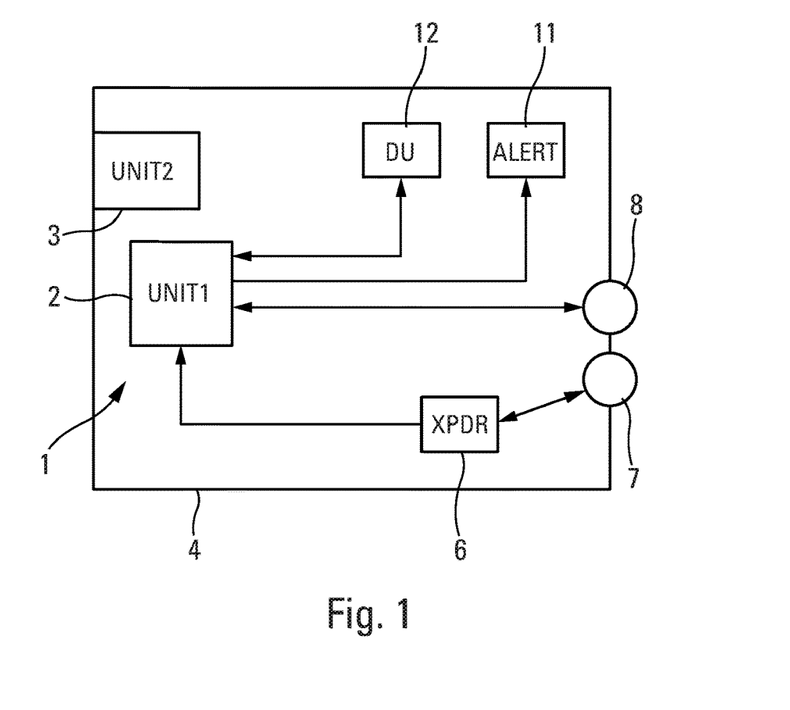
FIG. 1 is the block diagram of a particular embodiment of a collision avoidance system according to the disclosure herein.
Figure 2:
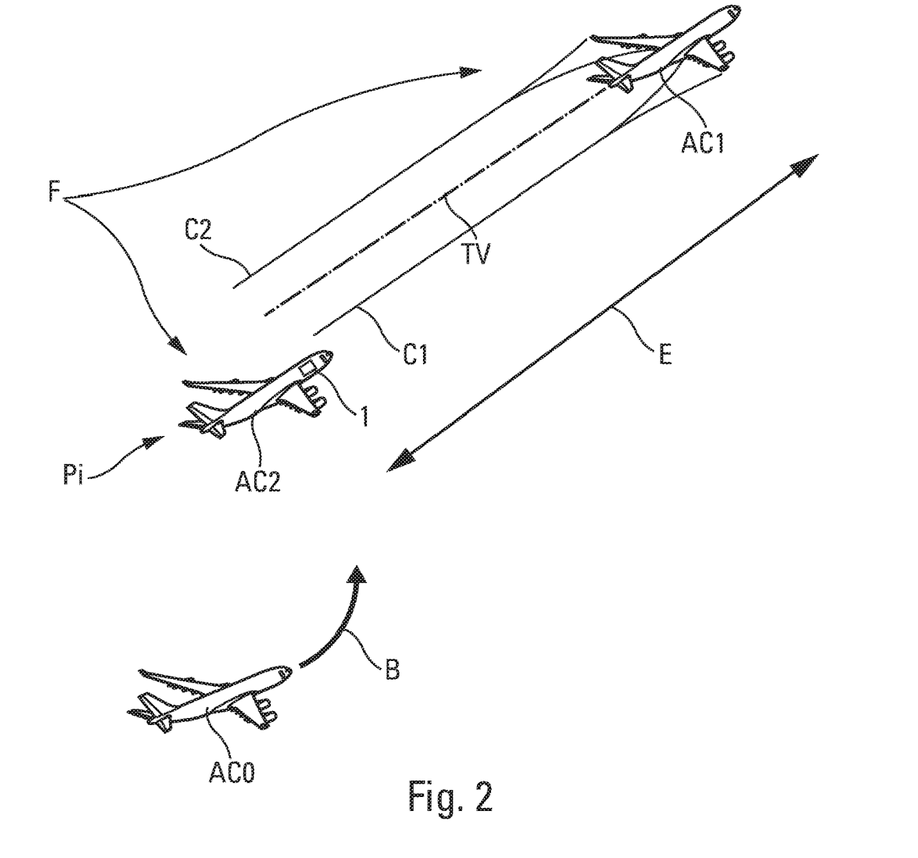
FIG. 2 is a schematic representation of an aircraft formation exhibiting a risk of collision with an intruder aircraft.

The system 1 used to illustrate the disclosure herein and schematically represented in FIG. 1 is a collision avoidance system for a trailer aircraft AC2 of a formation F of aircraft AC1, AC2, in particular a formation of transport airplanes relative to at least one aircraft AC0 external to the formation F, called intruder aircraft, as represented in FIG. 2.

The formation F comprises a lead aircraft AC1 and one or more trailer aircraft, namely a single trailer aircraft AC2 in the example of FIG. 2, trailing the lead aircraft AC1 (at a so-called initial position Pi) according to a spacing E. The lead aircraft AC1 follows a flight trajectory TV.

The object of the system 1 which is mounted on the trailer aircraft AC2, as represented very schematically, is to avoid a collision with the intruder aircraft AC0, that is to say with an aircraft not forming part of the formation F and risking coming into collision with the trailer aircraft AC2 of the formation F as illustrated by the arrow B if no avoidance maneuver is implemented.

The collision avoidance system 1 comprises at least one formation flight management unit (not specifically represented). Such a unit is configured to manage the formation flight at least for the trailer aircraft. The formation flight is such that the trailer aircraft fly by trailing the aircraft that they follow directly (namely the lead aircraft or another trailer aircraft) so as to maintain a constant spacing E between them, as represented in FIG. 2. In a preferred application, in particular in cruising flight, the aircraft AC1 and AC2 fly one behind the other at the same flight level with the same heading and the same speed.

The collision avoidance system 1 comprises, as represented in FIG. 1, an avoidance unit 2 (UNIT1) and a keeping unit 3 (UNIT2).

The units 2 and 3 form part of an embedded system 4, preferably an anti-collision system specified hereinbelow.

This system 4 further comprises, as represented in FIG. 1:
a transponder 6 (XPDR) linked to a transponder antenna 7;
an antenna 8 of TCAS ("Traffic Collision Avoidance System") type;
an audio alert unit 11 (ALERT); and
a display unit 12 (DU) that can used, in particular, as visual alert unit.

These various elements are linked to the avoidance unit 2, as represented in FIG. 1 within the system 4.

Preferably, the system 4 is therefore an anti-collision system of TCAS type. This anti-collision system makes it possible to ensure the safety of the air traffic by preventing the risks of collision in flight. Thus, when two aircraft converge towards one another, the anti-collision system computes an estimation of the collision time and emits (via the alert unit 11) an alert informing the crew of a possible future collision: such an alert is generally called "traffic advice" or "TA alert". If apropriate, the anti-collision system 4 also emits, for the attention of the crew, a vertical avoidance maneuver command (for example via the display unit 12) in order to exit from the potential collision situation: such an avoidance maneuver command is generally called "resolution advice" or "RA alert". The TA and RA alerts are embodied by voice messages (via the alert unit 11) and by the display of information (via the display unit 12) in the cockpit. In practice, the embedded anti-collision system 4 computes, generally, a time of collision in the horizontal plane (ratio between the horizontal distance between the two aircraft and their relative horizontal speed) and a time of collision in the vertical plane (ratio between the vertical distance between the two aircraft and their relative vertical speed). The duly computed collision times are compared to predetermined thresholds for the TA alerts and for the RA alerts (the predetermined thresholds also being a function of the altitude), and the alerts are triggered when the computed collision times are below the corresponding predetermined thresholds.

According to a variant, the computed collision times are also compared to probabilistic data.

Regarding the risk of collision the TCAS system emits information via the transponder 6 and its antenna 7, and receives information via the antenna 8.

Figure 3:
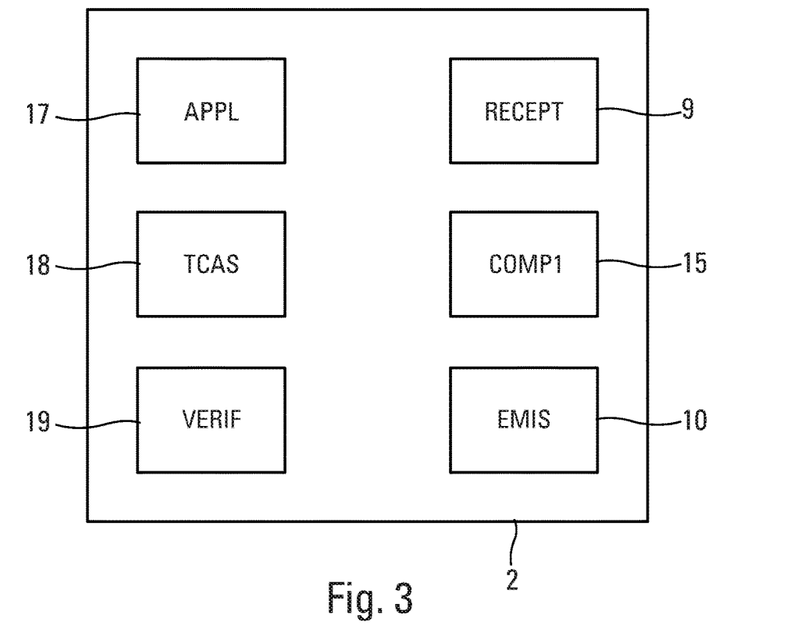
FIG. 3 is the block diagram of a particular embodiment of an avoidance unit forming part of the collision avoidance system.

Moreover, as represented in FIG. 3, the avoidance unit 2 comprises in particular:
a data reception unit 9 (RECEPT);
a computation unit 15 (COMP1); and
a data emission unit 10 (EMIS).

The units 9 and 10 are standard transceiver units capable of emitting and receiving information via antennas, notably the antenna 8 (TCAS).

Figure 4:
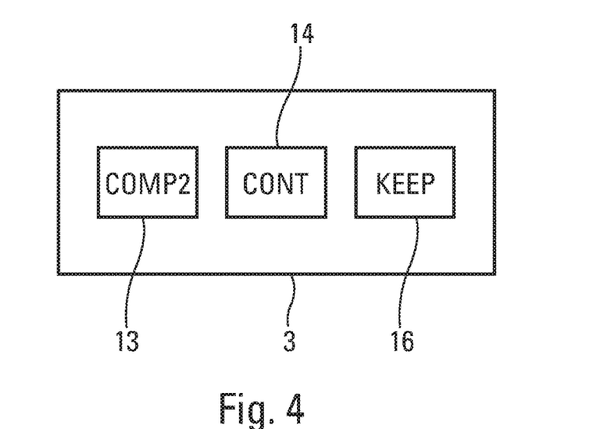
FIG. 4 is the block diagram of a particular embodiment of a keeping unit forming part of the collision avoidance system.

Furthermore, as represented in FIG. 4, the keeping unit 3 comprises in particular:
a computation unit 13 (COMP2); and
a control unit 14 (CONT).

Figure 5:
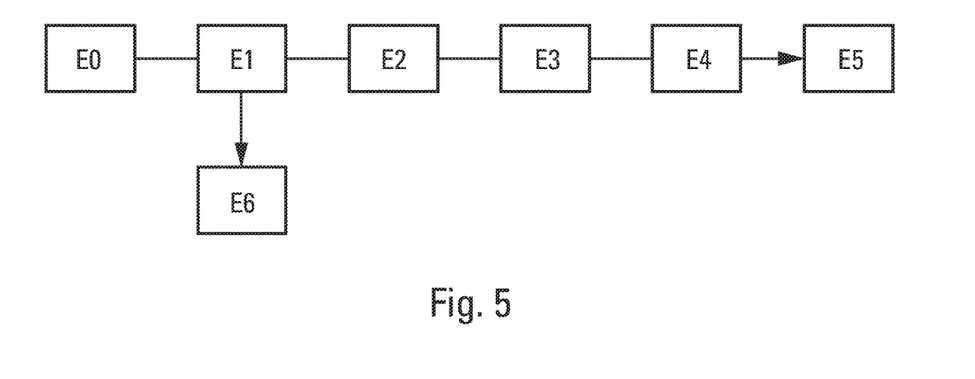
FIG. 5 is the block diagram of successive steps of the method, implemented by the collision avoidance system.

The collision avoidance system 1 which is embedded on the trailer aircraft AC2 (FIG. 2), implements the following series of steps, comprising, as represented in FIG. 5:
a reception step E1 implemented by the data reception unit 9 of the avoidance unit 2 and consisting in or comprising receiving information on risk of collision with the intruder aircraft AC0, the collision risk information being received as long as the risk of collision exists;
a computation step E2 implemented by the computation unit 15 of the avoidance unit 2 and consisting in or comprising determining at least one safety zone Z1, Z2, Z3 (FIG. 6) upon the reception of collision risk information.

Figure 6:
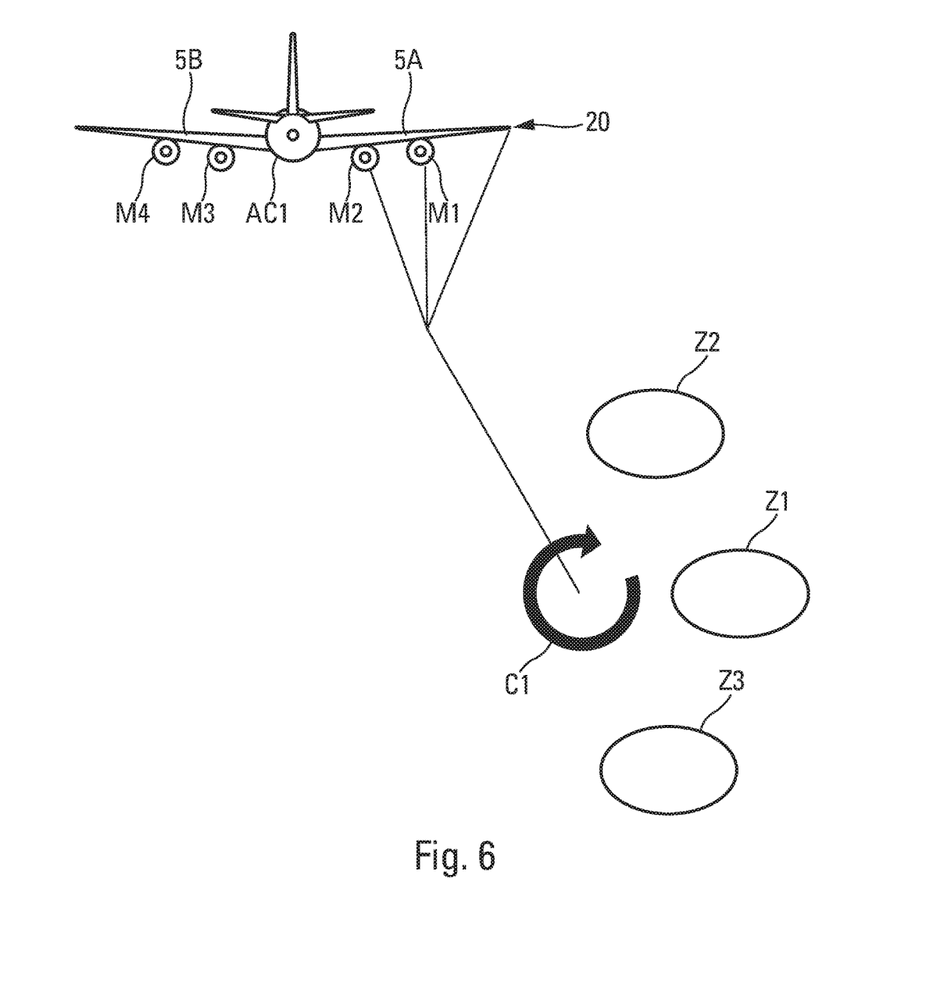
FIG. 6 shows the rear of an aircraft making it possible to specify so-called safety zones.

This safety zone Z1, Z2, Z3 corresponds to a zone located to the rear of the lead aircraft AC1, which is without wake turbulence(s) C1, C2 generated at least by the lead aircraft AC1. This safety zone Z1, Z2, Z3 however forms part of a general zone (situated for example at a distance of 300 meters around the flight trajectory TV) making it possible to maintain the formation. As schematically represented in FIG. 2, the lead aircraft AC1 generates wake turbulences C1 and C2 to the right and to the left of its flight trajectory TV. A wake turbulence (or vortex) C1, C2 is therefore an aerodynamic vortex which is formed downstream of the lead aircraft AC1, as represented in FIG. 6. In the example of FIG. 6, the lead aircraft AC1 has four engines M1 to M4 of which two (M1 and M2) are installed under the right wing 5A and of which the other two are installed under the left wing 5B. The wake turbulence can be generated by the gases ejected by the engines, such as the turbulence C1 to the right represented in FIG. 6, which can be generated at least partly by the engines M1 and M2. The wake turbulence can also be created at the end 20 of a wing 5A of the lead aircraft AC1, or on parts forming angles with the plane of the wings 5A and 5B, such as, for example, control surfaces when they are lowered. A safety zone Z1, Z2, Z3 is defined so as be always situated at the same position relative to the lead aircraft AC1 and it is displaced with the lead aircraft AC1 during the flight thereof;
a computation step E3 implemented by the computation unit 13 of the keeping unit 3 and consisting in or comprising determining, as specified hereinbelow, a safety point Ps (FIG. 7) dependent on the safety zone. This safety point Ps is thus always situated at the same position relative to the lead aircraft AC1 and is displaced with the lead aircraft AC1 during the flight thereof; and a control step E4 implemented by the control unit 14 of the keeping unit 3 and consisting in or comprising automatically bringing the trailer aircraft AC2 to the safety point Ps (FIG. 7), prior to the implementation of an avoidance maneuver.

Thus, the system 1 is able to bring the trailer aircraft AC into a hazard-free position (called safety position Ps) relative to the wake turbulences C1, C2 of the lead aircraft AC1, prior to the implementation of an avoidance maneuver. This safety position Ps is such that the trailer aircraft AC2 does not have to cross wake turbulence C1, C2 when it implements the avoidance maneuver. Thus, the system 1 makes it possible to not have to break the formation upon the approach of an intruder aircraft AC0 as specified hereinbelow with reference to FIG. 7. This makes it possible to retain the corresponding advantages notably in terms of cost of the (formation) flight.

Obviously, the system 1 implements these steps only if the trailer aircraft AC2 is indeed flying in formation.

Moreover, the keeping unit 3 comprises, in addition, a keeping module 16 (KEEP). This keeping module 16 is configured to implement a keeping step E5. This keeping step E5 consists in keeping the trailer aircraft AC2 at the safety point Ps relative to the lead aircraft AC1 as long as a collision risk alert is emitted, that is to say as long the risk of collision exists. When the alert is no longer emitted, the trailer aircraft AC2 is returned to its initial position Pi (FIG. 2) relative to the lead aircraft AC1.

The collision avoidance system 1 also comprises an avoidance device configured to implement an avoidance maneuver intended to avoid the collision with the intruder aircraft AC0 while maintaining the formation flight. This avoidance device comprises a command application unit 17 (APPL). In the example of FIG. 3, the unit 17 is incorporated in the avoidance unit 2. It can however also form part of the keeping unit 3.

The unit 17 generates commands intended to be used by manual or automatic piloting of the aircraft to implement the avoidance. The manual or automatic piloting can comprise a display unit, for example the display unit 12, to present commands to the pilots who are manually performing the piloting. It can also be an automatic piloting system which automatically implements the avoidance. In this case, the avoidance unit 2 also implements a step of computation of the avoidance maneuver specific to the lead aircraft in the case of a risk of conflict. This avoidance maneuver is computed by a module 18 of the TCAS system which is, for example, incorporated in the avoidance unit 2 as represented in FIG. 3.

In a particular embodiment, the series of steps also comprises an alert step E6, as represented in FIG. 5. This alert step E6 is implemented by the alert unit 11, 12 and consists in emitting at least one alert (audio and/or visual) in the cockpit of the trailer aircraft AC2 in case of reception of collision risk information. This alert is emitted as long as collision risk information is received.

The series of steps also comprises a verification step E0 implemented by a verification unit 19 (VERIF) and consisting in or comprising verifying prior to the implementation of the step E1, that the aircraft forming part of the aircraft formation are flying in formation.

For this verification, the verification unit 19 takes into account, for example and in a nonlimiting manner, criteria of distance and of heading of the different aircraft of the formation.

Moreover, the computation unit 15 of the avoidance unit 2 determines the safety zone or zones Z1, Z2, Z3 as a function of the geometry of the intruder aircraft AC0 (to avoid spurious alerts during the flight of the trailer aircraft AC2 to the safety position) and of the position of the trailer aircraft AC2 relative to the wake turbulences of the lead aircraft AC1. Geometry should be understood to mean the position and the flight trajectory of the intruder aircraft AC0. The zones Z1, Z2, Z3 are the potential protection zones of the trailer aircraft AC2 relative to the wake turbulence C1 on the right of the lead aircraft AC1.

For this, the computation unit 15 implements a predetermined logic for determining a safety zone, presented for example in a decision table.

By way of illustration, the decision table can comprise the following safety zones Z1, Z2, Z3, relative to the wake turbulence C1 to the right of the lead aircraft AC1 (FIGS. 2 and 6), as a function of the vertical and horizontal positions of the intruder aircraft AC0:

A/ if the intruder aircraft is located below and behind the trailer aircraft (as in the example of FIG. 2), a zone Z1 situated to the right of the turbulence C1 or a right upper zone Z2 (that is to say a zone situated above the zone to the right Z1);

B/ if the intruder aircraft is located below and in front of the trailer aircraft, the zone to the right Z1 or the right upper zone Z2;

C/ if the intruder aircraft is located below and to the right of the trailer aircraft, the zone to the right Z1 or the right upper zone Z2;

D/ if the intruder aircraft is located below and to the left of the trailer aircraft, the zone Z1 to the right or the right upper zone Z2;

E/ if the intruder aircraft is located above and behind the trailer aircraft, the zone to the right Z1 or a right lower zone Z3 (that is to say a zone situated below the zone to the right Z1);

F/ if the intruder aircraft is located above and in front of the trailer aircraft, the zone to the right Z1 or the right lower zone Z3;

G/ if the intruder aircraft is located above and to the right of the trailer aircraft, the zone to the right Z1 or the right lower zone Z3;

H/ if the intruder aircraft is located above and to the left of the trailer aircraft, the zone to the right Z1 or the right lower zone Z3;

I/ if the intruder aircraft is located at the same flight level and behind the trailer aircraft, the zone to the right Z1 or the right upper zone Z2 or the right lower zone Z3;

J/ if the intruder aircraft is located at the same flight level and in front of the trailer aircraft, the zone to the right Z1 or the right upper zone Z2 or the right lower zone Z3;

K/ if the intruder aircraft is located at the same flight level and to the right of the trailer aircraft, the right upper zone Z2 or the right lower zone Z3;

L/ if the intruder aircraft is located at the same flight level and to the left of the trailer aircraft, the zone to the right Z1 or the right upper zone Z2 or the right lower zone Z3.

The same principle applies for the wake turbulence C2 to the left of the lead aircraft AC1.

Moreover, the computation unit 13 of the keeping unit 3 determines the safety point Ps as a function of the safety zone or zones thus determined and of a wake turbulence model.

Figure 7:
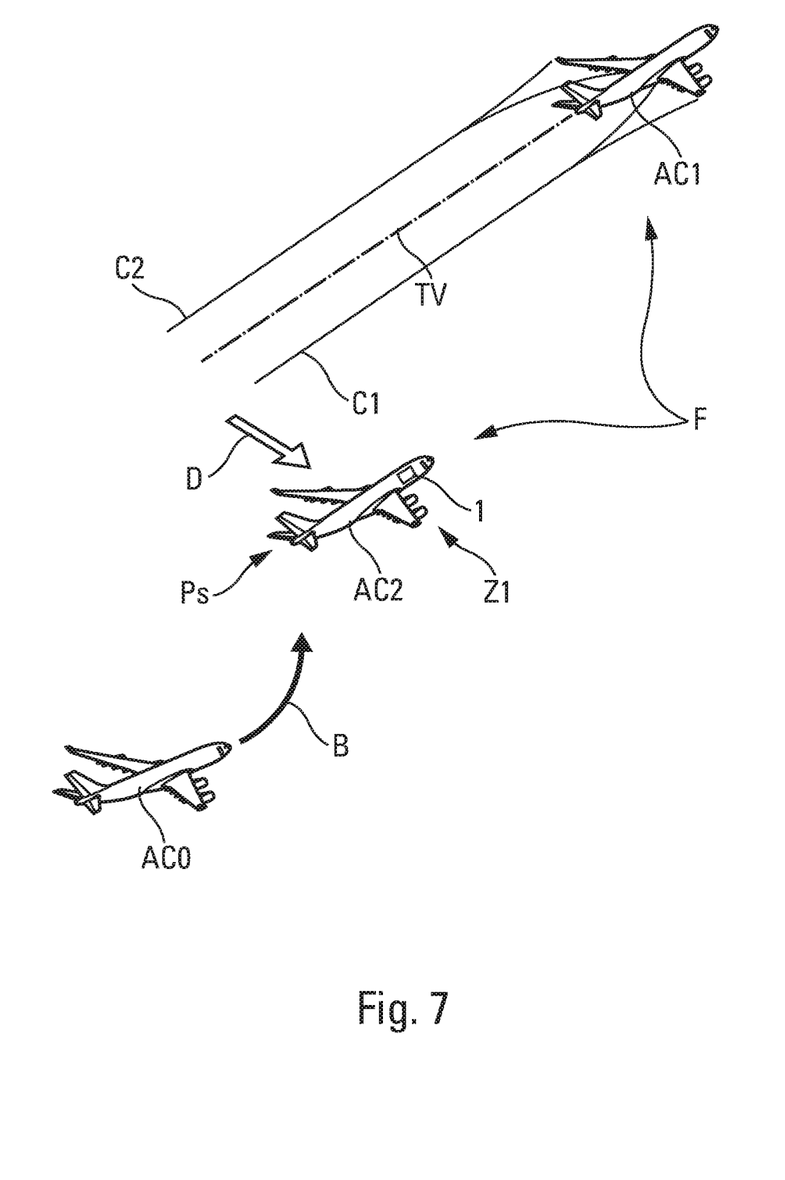
FIG. 7 is a representation similar to that of FIG. 2, after a displacement of the trailer aircraft into a safety position.

By way of illustration, in the example of FIGS. 2 and 7:

Initially, as represented in FIG. 2, the intruder aircraft AC0 flies behind and below the trailer aircraft AC2 of the formation F, and it is climbing as illustrated by the arrow B;

the TCAS system of trailer aircraft AC2 detects a risk of collision;

the system 1 implements the abovementioned steps to anticipate the avoidance maneuver in order to resolve the conflict with the formation-keeping;

consequently, in order to resolve this conflict, the trailer aircraft AC2 of the formation F is displaced laterally, as illustrated by an arrow D in FIG. 7 from the initial position Pi to the safety position Ps situated in the safety zone Z1, pending the implementation of the avoidance maneuver.

Thus, the formation F is not broken.

The system 1, as described above, thus notably offers the following advantages:

it makes it possible to keep the formation upon a risk of collision with an intruder aircraft, which makes it possible to retain the advantages of such a formation, and in particular a reduced consumption of the one or more trailer aircraft while minimizing the separation distance;

the operators on the ground can, after the conflict, continue to manage the flight of a formation and of an aircraft (intruder aircraft), instead of having to separately manage the flights of all the aircraft concerned; and for the on-board operations, the resolution of the conflict is implemented more rapidly and the workload of the crew is reduced.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A collision avoidance method for at least one trailer aircraft of an aircraft formation, relative to at least one intruder aircraft external to the aircraft formation, the aircraft formation comprising a lead aircraft and the at least one trailer aircraft, the method comprising a series of steps, implemented on the trailer aircraft and comprising at least:
   a first computation step implemented by a computation unit and comprising determining at least one safety zone as a function of a position and a flight trajectory of the at least one intruder aircraft, the safety zone corresponding to a zone located to a rear of the lead aircraft;
   a second computation step implemented by a second computation unit and comprising determining a safety point dependent on the safety zone; and
   a control step implemented by a control unit and comprising maneuvering the trailer aircraft to the safety point,
   wherein the series of steps comprises a reception step implemented by a data reception unit and comprising receiving information from an anti-collision system of the trailer aircraft on risk of collision with the intruder aircraft, the collision risk information being received as long as the risk of collision exists,
   wherein the first computation step comprises determining the at least one safety zone upon reception of collision risk information, the safety zone being with no wake turbulence generated at least by the lead aircraft,
   wherein the control step comprises bringing maneuvering the trailer aircraft to the safety point prior to an implementation of an avoidance maneuver to avoid the at least one intruder aircraft, and
   wherein the safety point is positioned such that the trailer aircraft does not encounter wake turbulence generated by at least the lead aircraft during the avoidance maneuver.

2. The method according to claim 1, wherein the collision risk information is generated by a collision risk detection method.

3. The method according to claim 2, wherein the first computation step comprises a step of implementation of a predetermined logic for determining a safety zone.

4. The method according to claim 1, wherein the first computation step comprises a step of implementation of a predetermined logic for determining a safety zone.

5. The method according to claim 1, wherein the first computation step comprises determining the safety zone as a function of a position of the trailer aircraft relative to wake turbulences of the lead aircraft.

6. The method according to claim 1, wherein the second computation step comprises determining the safety point as a function of the safety zone and of a wake turbulence model.

7. The method according to claim 1, wherein the series of steps comprises an alert step implemented by at least one alert unit and comprising emitting at least one alert in a cockpit of the trailer aircraft, in case of reception of collision risk information, the alert being emitted as long as such collision risk information is received.

8. The method according to claim 1, wherein the series of steps comprises a keeping step, implemented after the control step and comprising keeping the trailer aircraft at the safety point relative to the lead aircraft, as long as a collision risk alert is emitted.

9. The method according to claim 1, comprising an avoidance step implemented after the series of steps and comprising implementing an avoidance maneuver on the trailer aircraft, making it possible to avoid the collision with the intruder aircraft while maintaining the formation flight.

10. A collision avoidance system for a trailer aircraft of an aircraft formation, the collision avoidance system being intended to avoid a collision relative to at least one intruder aircraft external to the aircraft formation aircraft, the aircraft formation comprising a lead aircraft and the at least one trailer aircraft, the collision avoidance system comprising:
  a first computation unit comprising one or more processors, and configured to determine at least one safety zone as a function of a position and a flight trajectory of the at least one intruder aircraft, the safety zone corresponding to a zone located to a rear of the lead aircraft;
  a second computation unit comprising one or more processors, and configured to determine a safety point dependent on the safety zone; and
  a control unit comprising one or more processors, and configured to maneuver the trailer aircraft to the safety point,
  wherein the collision avoidance system comprises a data reception unit configured to receive information on risk of collision, from an anti-collision system of the trailer aircraft, with the intruder aircraft, the collision risk information being received as long as the risk of collision exists,
  wherein the first computation unit is configured to determine the at least one safety zone upon the reception of collision risk information, the safety zone being without wake turbulence generated at least by the lead aircraft,
  wherein the control unit is configured to maneuver the trailer aircraft to the safety point prior to an implementation of an avoidance maneuver to avoid the at least one intruder aircraft, and
  wherein the safety point is positioned such that the trailer aircraft does not encounter wake turbulence generated by at least the lead aircraft during the avoidance maneuver.

11. The system according to claim 10, wherein the data reception unit and the first computation unit form part of an avoidance unit.

12. The system according to claim 11, wherein the second computation unit and the control unit form part of a keeping unit.

13. The system according to claim 10, wherein the second computation unit and the control unit form part of a keeping unit.

14. The system according to claim 10, comprising at least one alert unit configured to emit at least one alert in a cockpit of the trailer aircraft in case of reception of collision risk information, the alert being emitted as long as such collision risk information is received.

15. The system according to claim 10, comprising an avoidance device configured to implement an avoidance maneuver making it possible to avoid the collision with the intruder aircraft while maintaining the formation flight.

16. A trailer aircraft, of an aircraft formation, comprising a collision avoidance system for avoiding a collision relative to at least one intruder aircraft external to the aircraft formation, the aircraft formation comprising a lead aircraft and the trailer aircraft, the collision avoidance system comprising:
  a first computation unit comprising one or more processors, and configured to determine at least one safety zone as a function of a position and a flight trajectory of the at least one intruder aircraft, the safety zone corresponding to a zone located to a rear of the lead aircraft;
  a second computation unit comprising one or more processors, and configured to determine a safety point dependent on the safety zone; and
  a control unit comprising one or more processors, and configured to maneuver the trailer aircraft to the safety point,
  wherein the collision avoidance system comprises a data reception unit configured to receive information on risk of collision, from an anti-collision system of the trailer aircraft, with the intruder aircraft, the collision risk information being received as long as the risk of collision exists,
  wherein the first computation unit is configured to determine the at least one safety zone upon the reception of collision risk information, the safety zone being without wake turbulence generated at least by the lead aircraft,
  wherein the control unit is configured to maneuver the trailer aircraft to the safety point prior to an implementation of an avoidance maneuver to avoid the at least one intruder aircraft, and
  wherein the safety point is positioned such that the trailer aircraft does not encounter wake turbulence generated by at least the lead aircraft during the avoidance maneuver.

17. The system according to claim 10, wherein first computation unit is further configured to determine the at least one safety zone as a function of a position of the trailer aircraft relative to wake turbulences of the lead aircraft.

* * * * *

UNITED STATES PATENT AND TRADEMARK OFFICE
CERTIFICATE OF CORRECTION

PATENT NO. : 10,347,143 B2
APPLICATION NO. : 15/491771
DATED : July 9, 2019
INVENTOR(S) : Robin et al.

Page 1 of 1

It is certified that error appears in the above-identified patent and that said Letters Patent is hereby corrected as shown below:

In the Claims

Column 10, Line 35, Claim 1, should read "...wherein the control step comprises maneuvering the trailer...".

Signed and Sealed this
Twenty-fourth Day of December, 2019

Andrei Iancu
*Director of the United States Patent and Trademark Office*